(12) United States Patent
Silk (10) Patent No.: US 8,140,097 B2
(45) Date of Patent: Mar. 20, 2012

(54) MOBILE DOMAIN REGISTRY AND CONTENT PLATFORM

(75) Inventor: Matthew Silk, Santa Monica, CA (US)

(73) Assignee: Waterfall Mobile, Inc., San Francisco, CA (US)

( * ) Notice: Subject to any disclaimer, the term of this patent is extended or adjusted under 35 U.S.C. 154(b) by 573 days.

(21) Appl. No.: 12/234,522

(22) Filed: Sep. 19, 2008

(65) Prior Publication Data
US 2009/0081949 A1 Mar. 26, 2009

Related U.S. Application Data

(60) Provisional application No. 60/973,842, filed on Sep. 20, 2007.

(51) Int. Cl.
*H04W 4/00* (2009.01)
(52) U.S. Cl. .......... 455/466; 370/329; 379/37; 455/410; 455/411
(58) Field of Classification Search .................. 455/466, 455/410, 411; 370/329; 379/37
See application file for complete search history.

(56) References Cited

U.S. PATENT DOCUMENTS

| 7,212,506 | B2 * | 5/2007 | Varney et ...................... 370/329 |
| 2003/0012344 | A1 * | 1/2003 | Agarwal et al. ................. 379/37 |
| 2006/0111131 | A1 * | 5/2006 | Shin et al. ..................... 455/466 |

* cited by examiner

*Primary Examiner* — Dwayne Bost
*Assistant Examiner* — Amancio Gonzalez
(74) *Attorney, Agent, or Firm* — Perkins Coie LLP (57) ABSTRACT

A method and system for broadcasting information in real time to a plurality of recipients. The method can include authenticating an administrator. The method can include selecting a message type of an SMS message, wherein the message type is at least one of: a broadcast message wherein recipients cannot reply to the broadcast message, and a two-way messaging alert wherein recipients can reply to the two-way messaging alert. The method can include selecting recipients for the SMS message from a set of subscribers. The method can include receiving a body of the SMS message from the administrator. The method can include, responsive to a first administrator request, transmitting an administrator-entered test message to an administrator-specified test recipient. The method can include transmitting the SMS message to the selected recipients.

20 Claims, 4 Drawing Sheets

MOBILE DOMAIN REGISTRY AND CONTENT PLATFORM

CROSS REFERENCE TO RELATED APPLICATIONS

This application claims the benefit of priority to U.S. Provisional Patent Application Ser. No. 60/973,842, filed Sep. 20, 2007, entitled "Mobile Domain Registry and Content Platform" by Matthew Silk, which application is hereby incorporated by reference.

BACKGROUND

Emergencies can include natural disasters, terror attacks, violent crimes, infrastructure breakdown, hazardous material accidents, and other dangers that can potentially harm a large number of people. Clear communications is crucial in effectively managing emergencies and emergency responses.

Cellular telephones have many properties for effective emergency communications. They are usually in the possession of the communication recipient, they are not reliant on being at a specific location or plugged into a physical location, and people are comfortable with them.

However, cellular telephones have extensive resource overhead which prohibits setting up calls to people affected by an emergency. For example, cellular circuits would be overloaded if calls are made to all students on a school campus in case of an emergency. In addition, it would time-consuming to initiate many phone calls.

Short Message Service (SMS) allows the delivery of text messages to cellular phones of individuals. While SMS messages are delivered over cellular networks, they require very little resource overhead and can easily be broadcasted to a large target population.

Thus, there is a need to provide improved information broadcast in an emergency environment.

DETAILED DESCRIPTION

The present invention, also called broadcast, is a web-based platform using mobile SMS (text) messaging and subscriber management tools to deploy messaging solutions quickly. In particular, the system is designed to enhance existing notification systems for schools and organizations to easily and rapidly communicate with users. In one embodiment, the system may be used for general notifications, but the system is particularly useful and targeted for communication with users during emergency situations. Emergency situations during which the broadcast system would be useful include, but not limited to, natural disasters, terror attacks, violent crimes, infrastructure breakdown, hazardous material accidents, and gas leaks.

Rather than using voice calls which overwhelm networks during emergencies and are not recommended for emergency communication systems, SMS text message alerts are sent to mobile telephone users. SMS text messages are smaller data packets than other types of transmissions and are less likely to cause failure to critical voice networks during emergency situations. Also, mobile telephones are an extremely popular form of communication, thus text message alerts are likely to quickly reach a large segment of the population affected by the emergency.

In one embodiment, broadcast may be added to emergency action plans at schools and will become an additional communication channel to help deliver vital information to students, faculty, staff, parents of the students, or any other members associated with the school community. For example, the broadcast platform may be used in emergency situations where students or other members of the school's community are in danger, and the school needs to communicate with them. When an emergency is declared on a school campus, assigned administrators can log in to a web-based system and instantly send text messages alerts to appropriate groups. No extensive training is needed before an administrator can send an alert. Assigned administrators, campus safety and police officials, and other government officials would be the only people permitted access to the system to send alerts.

In one embodiment, users at the scene or with information about the emergency situation can respond to alerts with updates by text. This type of two-way alert messaging is useful for obtaining information from within the emergency zone. In one aspect, the text messages sent by users are delivered to an email address provided by the school administrator. Thus, important information is sent to a person who can make effectively use the information during the emergency. In addition, individuals subscribing to the system that have registered with the school can send text messages into the system to receive vital information at any time.

The broadcast system is approved to work on all major mobile telephone carriers in the United States. All mobile telephone users who have a text messaging plan will be eligible to receive alerts. Users may subscribe to appropriate alert lists by text messaging the broadcast system's number, for example, 253788, registering online through a broadcast system managed website, or being uploaded through the school to which the user is affiliated. Users may unsubscribe by texting the words "stop" on "unsub" to the broadcast system, as required on all text messaging based systems offered by mobile carriers.

In one embodiment, a main account holder for a school account may enroll a school or other organization in the broadcast system online; the main account holder may be located anywhere during the enrollment process. To enroll, the main account holder enters a name, email address, phone number, the school name, and the state that the campus is located in. A username, password, and security PIN are chosen for the main account holder at the time of enrollment. If the main account holder wishes to allow others the ability to send alerts on the system, access may be granted. In one embodiment, four additional people associated with the school may be granted access. Contact information for the additional people including, but not limited to, an email address and telephone number will be needed to authorize the additional people to send text message alerts through the system. A security PIN will also be assigned to each additional person.

In one embodiment, a keyword must be selected to uniquely identify the school. The keyword would then be used in text messages. For example, if the keyword chosen is "UCLA" for the University of California at Los Angeles, then a member of the UCLA community would text message "UCLA" to the broadcast system number which is 253788. Upon text messaging the keyword, the person will receive a welcome message to the emergency alert system.

The keyword selected for a particular school has two functions. If the user of the mobile telephone number from which the keyword has been text messaged is not a current subscriber, the user will receive a welcome message on the mobile telephone and the opportunity to register as a subscriber for security alerts. If the user of the mobile telephone number has already been registered as a recipient of security alerts from the school, the mobile telephone will receive a message that displays several menu choices. Each available menu choice may correspond with emergency numbers and locations including, but not limited to, campus police, local police, local fire department, a crisis hotline, or substance abuse help. It will be apparent to a person skilled in the art that many other emergency numbers and facilities may be selected as choices by the main account holder to be displayed on the message delivered to a subscriber.

In one embodiment, when the main account holder enrolls an organization in the broadcast system online, the information that the organization would like to collect from subscribers may be selected. Information to be collected include, but are not limited to, an email address, the affiliation of the subscriber to the school, for example student, faculty, staff, parent, or alumni, whether the subscriber lives on-campus or off-campus, and the subscriber's name. Predetermined fields may be turned on or off for all web-based subscriber registration associated with the school's keyword.

In one embodiment, the school administrator may enter specific keyword content for the school. Content may include, but is not limited to, emergency numbers and locations such as campus police, the local police, the local fire department, a crisis hotline, or substance abuse help. Messages to be delivered in association with one of the emergency numbers or locations may be specified by the administrator. The school administrator may also modify the opt-in message displayed to subscribers who enter text the school's keyword to the broadcast system.

All messages that are sent to subscribers may be personalized and modified by the school's administrator or anyone granted access to the system by the school administrator. All selections made by an authorized school administrator with a valid PIN may be modified at any time through the broadcast system website.

Figure 1:
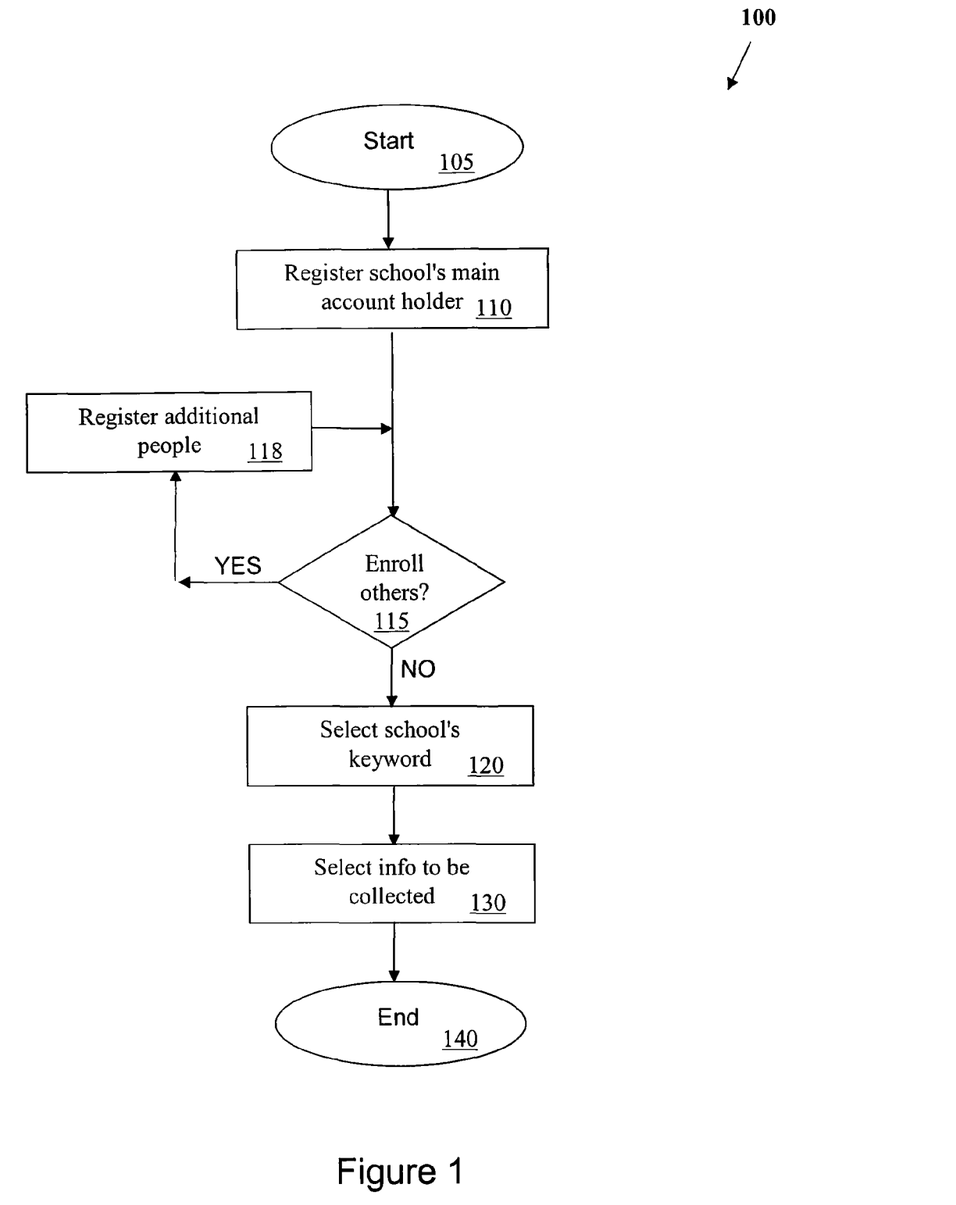
FIG. 1 is a flow chart illustrating an example of how an administrator may enroll a school in the text messaging system of the present invention.

FIG. 1 is a flow chart 100 illustrating one embodiment of a method 100 of enrolling a school or organization in the broadcast system. The method begins at 105. In block 110, the school's administrator and main account holder registers the school by entering a name for the administrator, an email address to receive subscriber reply messages, a telephone number to receive text message alerts, the school's name, and the state that the campus is located in. The school's administrator also chooses a username, password, and a security PIN. For example, the school's administrator can be a school official or representative.

At decision point 115, the administrator decides whether to grant access to other people at the school. If so, additional people are registered in block 118 by entering a name, an email address and a telephone number. A security PIN can also be assigned to each person, either the same PIN as the main account holder's PIN or a different PIN. The process of registering each additional person is repeated until every person to be registered is entered into the system. For example, the system can impose a maximum number of additional administrators.

In block 120, the school administrator selects a keyword to identify the school. The keyword will be used in text messages. The keyword selected for a particular school has two functions. If the user of the mobile telephone number from which the keyword has been text messaged is not a current subscriber, the user will receive a welcome message on the mobile telephone and the opportunity to register as a subscriber for security alerts. If the user of the mobile telephone number has already been registered as a recipient of security alerts from the school, the mobile telephone will receive a message that displays several menu choices.

In block 130, the school administrator chooses the information that the school would like to collect from subscribers, such as a mobile telephone number for texting alert messages to, an email address, and the subscriber's affiliation to the school.

In one embodiment, after enrollment of a school or organization with a broadcast system, an emergency alert may be sent from the broadcast system's webpage at any time by first entering a registered PIN number. Entering a PIN associated with the school's keyword grants access to a webpage where an emergency alert message can be created. The emergency alert may be selected to be a broadcast message or two-way alerting. A broadcast message does not allow any information to be sent in reply to a received emergency alert. In contrast, two-way alerting allows all recipients of the alert message to reply, and replies are emailed to the main account holder's email address in real-time as they are received. With two-way alerting, a message may be appended to the emergency alert stating that the subscriber may reply to the alert with any information.

An emergency alert may be sent to the entire subscriber list for the school or the alert may be sent to select groups. Examples of select groups include, but are not limited to, student, faculty, staff, on-campus residents, and off-campus residents.

In one aspect, after creating the message, selecting the type of message, and authorizing the recipient list, a test message may be sent to a limited number of mobile telephone numbers by indicating the telephone numbers to receive the test message. Then upon approval of the alert message, the emergency alert will be transmitted to all subscribers on the selected recipient list.

The method ends in 140.

Figure 2:
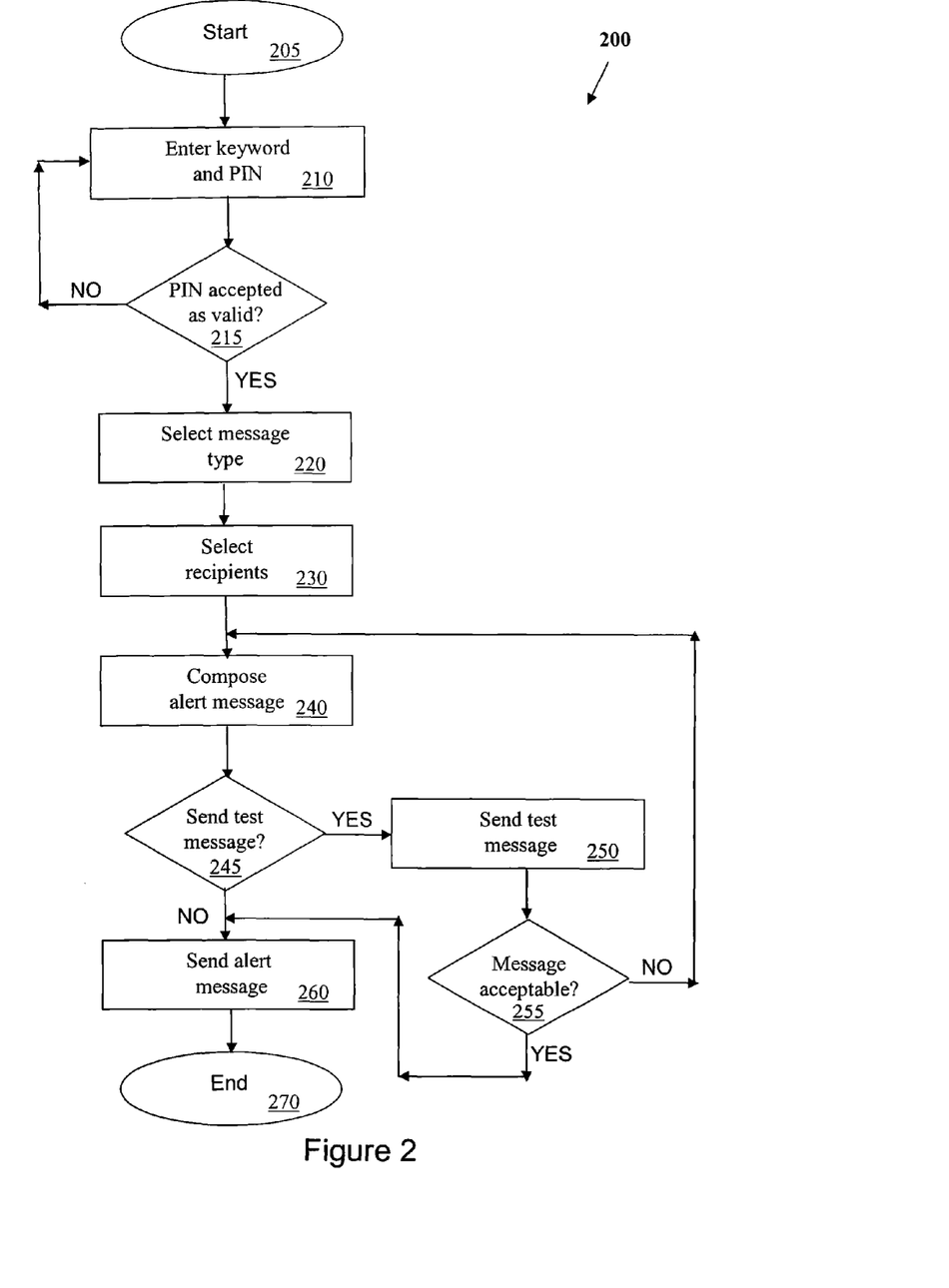
FIG. 2 is a flow chart illustrating an example of how to log in to a website managed by the present invention to send a text message alert.

FIG. 2 is a flow chart 200 illustrating an embodiment of a method 200 of an administrator logging in to the broadcast system to send an emergency alert message to subscribers. The method starts in 205. In block 210, the administrator enters the keyword selected for the school and the administrator's assigned PIN.

At decision point 215, the administrator receives a message from the broadcast system specifying whether the entered PIN is valid for the indicated school. If the PIN is not valid, the administrator will be prompted again in block 210 to re-enter the school's keyword and PIN.

If the entered PIN is accepted as valid, the administrator selects the type of message alert to be sent in block 220. Two choices are available, either a broadcast message or a two-way messaging alert. A broadcast message does not permit subscribers to reply to the message, while a two-way messaging alert allows subscribers to send text messages to the system These messages are immediately sent to the administrator's email address as well.

In block 230, the administrator selects recipients for the emergency alert message. For example, the administrator can enter a cellular telephone number of a recipient. Alternatively, the administrator can select pre-defined groups of recipients. Example pre-defined groups of recipients can include: on-campus residents, off-campus residents, students, professors, etc.

In block 240, the administrator composes the emergency alert message to be sent to subscribers. The alert may include, but is not limited to, a message that describes places to avoid, safe locations to gather, actions to take, or actions to refrain from taking.

At decision point 245, the administrator decides whether to send a test message. If so, in block 250 the administrator can enter one or more mobile telephone numbers to receive the test message. If the alert message is unacceptable in block 255, the administrator can return to block 240 to re-compose the alert message, and continue as described previously. If the alert message is acceptable, the administrator may send the alert message in block 260. If at decision point 245, the administrator does not wish to send a test message, the administrator may send the alert message directly to subscribers in block 260.

In one embodiment, alerts may be monitored at a monitoring webpage. The official time stamp of the alert and the number of subscribers the alert was transmitted to is indicated. Administrators may check the content of the alert message, the timestamp, the sender, and whether two-way alerting has been activated at the monitoring website. The monitoring webpage also provides access to the replies received from subscribers. A number indicating the total number of replies received in response to each alert message is shown. The full content of each reply message is also available by clicking on the number of replies indicated for a particular message.

In one aspect, the broadcast website maintains a complete history of all alerts sent, including the date and timestamp, the contents of the alert message, who the recipients of the alerts were, and all two-way alerting replies sent by subscribers. The alert history is accessible by administrators with a PIN number.

In one aspect, subscribers can be managed by administrators through a dedicated webpage on the broadcast website which is accessible by PIN number. The total number of subscribers is automatically displayed. Other options available may include, but is not limited to, viewing all subscribers or searching for a particular mobile telephone number among the registrants from the school. Each listed subscriber has an associated trash can icon visible in the display. Clicking on the icon prompts the administrator to remove the subscriber from the list.

The method ends in 270.

Figure 3:
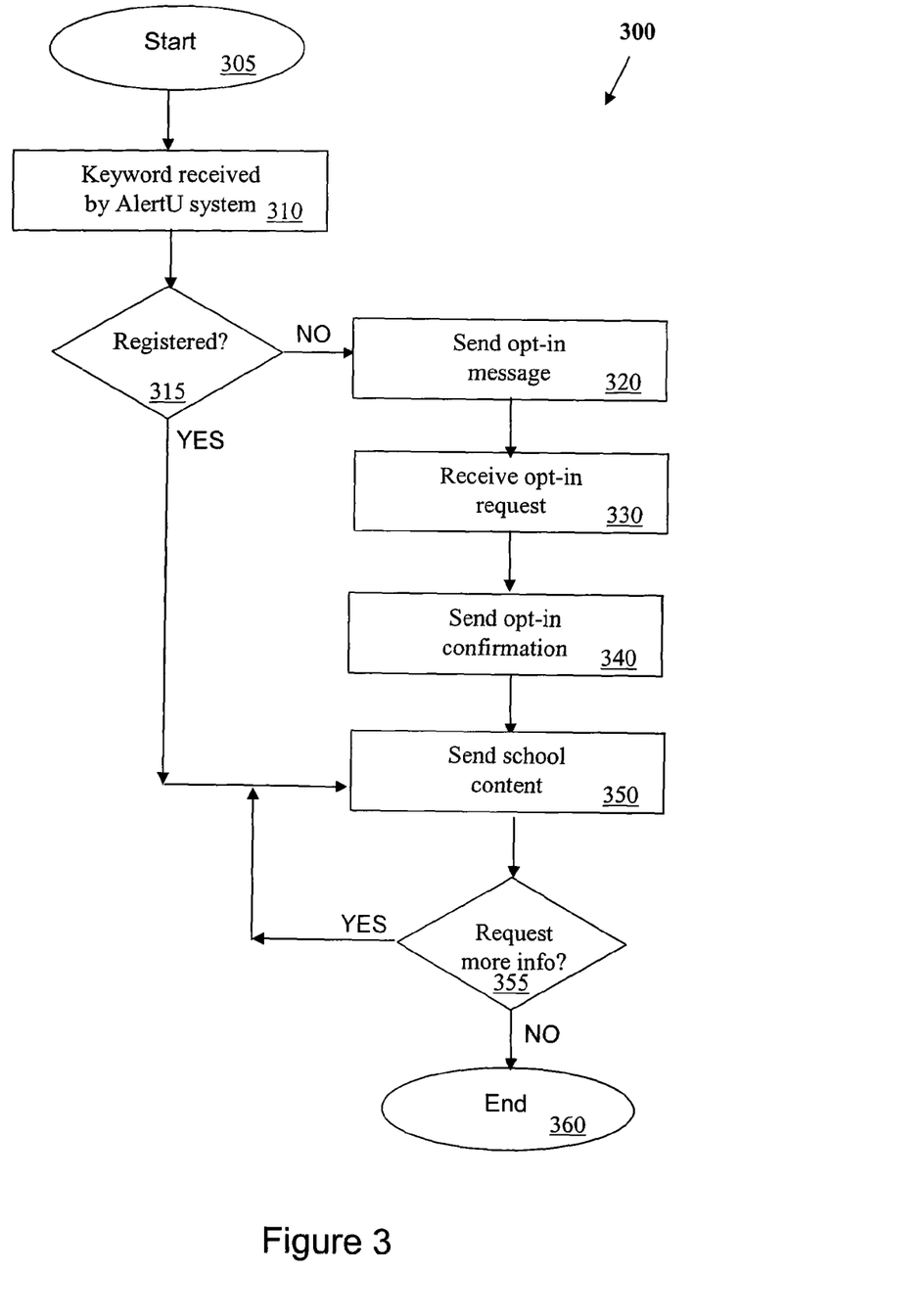
FIG. 3 is flow chart illustrating an example of messages that may be sent to a subscriber depending on the subscriber's input.

FIG. 3 is a flow chart illustrating an example of a method 300 by which the broadcast system determines which messages to send to a subscriber. The method begins in 305. In block 310, the system receives a keyword from a subscriber.

At decision point 315, the system determines if the subscriber is a registered member of the school associated with the keyword. If so, then in block 350 the system sends the mobile telephone user of the subscriber menu choices which correspond to emergency numbers and locations for the subscriber's school previously entered by the school administrator. At decision point 355, the system determines if a reply for further information has been received from the subscriber. If so, in block 350, the system sends any other information previously provided by the school's administrator.

If at decision point 315, the system determines that the subscriber is not a registered member of the school associated with the keyword, in block 320 the system sends a message requesting that the subscriber opt-in as a subscriber. The system receives an opt-in request in response from the subscriber in block 330. In block 340 the receipt of the opt-in request prompts the system to send a confirmation message to the subscriber. In block 350, the system then sends the subscriber menu choices which correspond to emergency numbers and locations for the subscriber's school. The system continues from this point as described above.

The method ends in 360.

Figure 4:
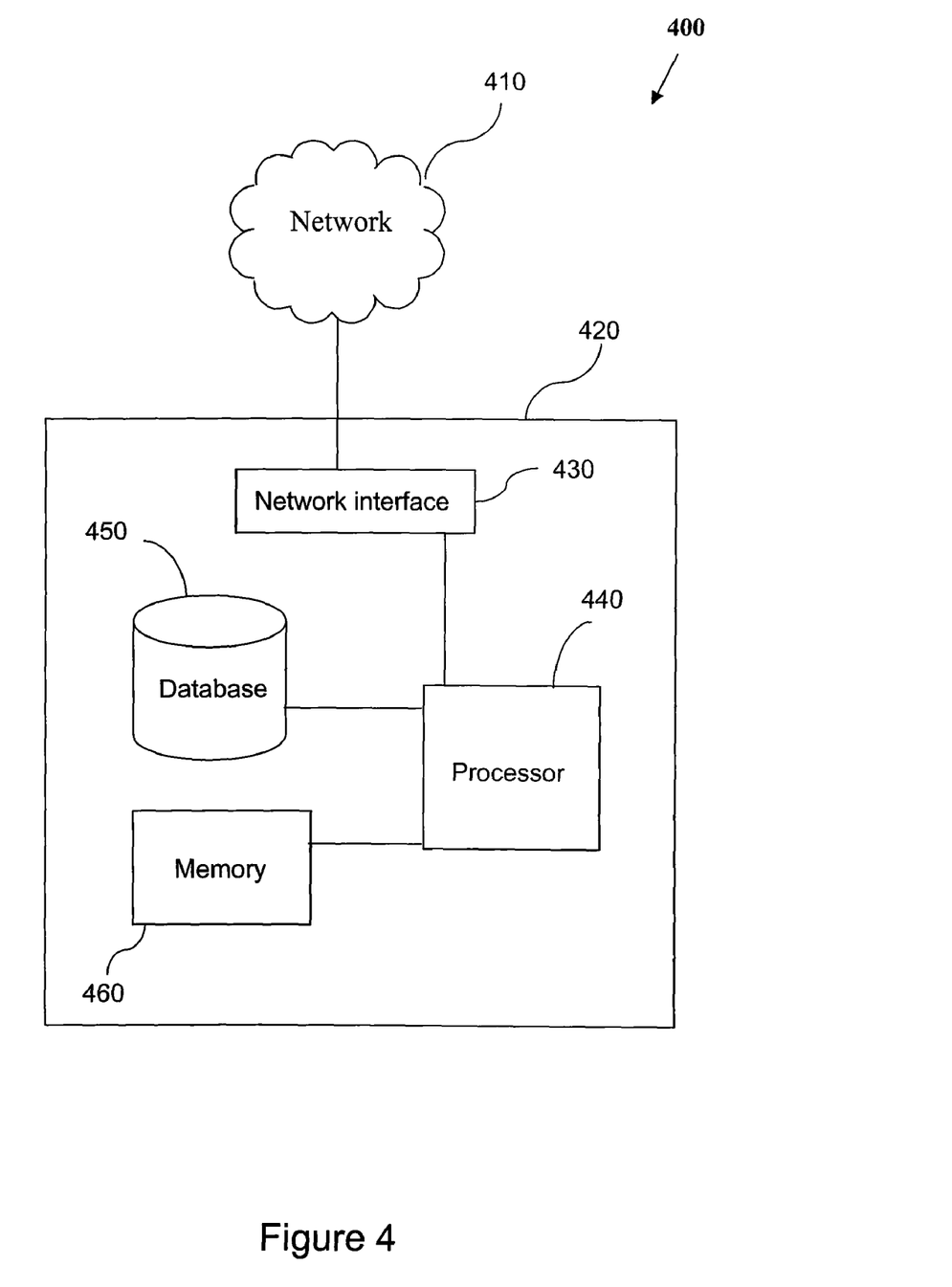
FIG. 4 is a diagram of one embodiment of the web-based platform of the present invention.

FIG. 4 is a diagram 400 of one embodiment of the web-based platform of the present invention. The broadcast system 420 has a network interface 430 which is capable of sending and receiving text messages as well as webpage content over a network 410.

The broadcast system includes a processor 440 for processing subscriber requests, school enrollments, webpage entries, webpage requests, and sending emergency alert messages to subscribers. The processor 440 can access a database 450 and a memory 460. All information entered into the broadcast website by a school administrator can be stored in a database 450. This includes, but is not limited to school keywords and addresses, information associated with administrators of a school like email addresses, phone numbers, and PINs, and messages to be sent to subscribers. The database also stores subscribers associated with registered schools including, but not limited to, subscriber names, subscriber mobile telephone numbers, and a subscriber's affiliation with the school. For example, the information can be encrypted or otherwise secured. The memory 460 is used to store programs to be executed by the processor 440 and for storage.

As discussed above, an example embodiment of the present invention can be a method for broadcasting information in real time. The method can include authenticating an administrator. The method can include selecting a message type of an SMS message, wherein the message type is at least one of: a broadcast message wherein recipients cannot reply to the broadcast message, and a two-way messaging alert wherein recipients can reply to the two-way messaging alert. The method can include selecting recipients for the SMS message from a set of subscribers. The method can include receiving a body of the SMS message from the administrator. The method can include, responsive to a first administrator request, transmitting an administrator-entered test message to an administrator-specified test recipient. The method can include transmitting the SMS message to the selected recipients. The method can include compiling recipient responses to the SMS message if the SMS message is a two-way messaging alert. The method can include displaying the compiled recipient responses to the administrator. Each subscriber can be associated with subscriber information including a cellular phone number, a subscriber name, and a group. The recipients can be selected from a set of predefined groups. The method can include, responsive to a second administrator request, displaying previously transmitted SMS messages. The administrator can be an authorized school official. Each subscriber can be a student of a school administrated by the authorized school official.

Another example embodiment of the present invention can be a system for broadcasting information in real time. The system can include a server. The server can be configured to authenticate an administrator. The server can be configured to select a message type of an SMS message, wherein the message type is at least one of: a broadcast message wherein recipients cannot reply to the broadcast message, and a two-way messaging alert wherein recipients can reply to the two-way messaging alert. The server can be configured to select recipients for the SMS message from a set of subscribers. The server can be configured to receive a body of the SMS message from the administrator. The server can be configured to, responsive to a first administrator request, transmit an administrator-entered test message to an administrator-specified test recipient. The server can be configured to transmit the SMS message to the selected recipients. The server can be configured to compile recipient responses to the SMS message if the SMS message is a two-way messaging alert. The server can be configured to display the compiled recipient responses to the administrator. Each subscriber can be associated with subscriber information including a cellular phone number, a subscriber name, and a group. The recipients can be selected from a set of predefined groups. The server can be configured to, responsive to a second administrator request, display previously transmitted SMS messages. The administrator can be an authorized school official. Each subscriber can be a student of a school administrated by the authorized school official.

Another example embodiment of the present invention can be a computer-readable medium including instructions adapted to execute a method for broadcasting information in real time. The method can include authenticating an administrator. The method can include selecting a message type of an SMS message, wherein the message type is at least one of: a broadcast message wherein recipients cannot reply to the broadcast message, and a two-way messaging alert wherein recipients can reply to the two-way messaging alert. The method can include selecting recipients for the SMS message from a set of subscribers. The method can include receiving a body of the SMS message from the administrator. The method can include, responsive to a first administrator request, transmitting an administrator-entered test message to an administrator-specified test recipient. The method can include transmitting the SMS message to the selected recipients. The method can include compiling recipient responses to the SMS message if the SMS message is a two-way messaging alert. The method can include displaying the compiled recipient responses to the administrator. Each subscriber can be associated with subscriber information including a cellular phone number, a subscriber name, and a group. The recipients can be selected from a set of predefined groups. The method can include, responsive to a second administrator request, displaying previously transmitted SMS messages. The administrator can be an authorized school official. Each subscriber can be a student of a school administrated by the authorized school official.

The above detailed description of examples of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having functions, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, or may be performed at different times.

Reference in this specification to "one embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention

What is claimed is:

1. A method for broadcasting information in real time to a plurality of recipients, the method comprising:

receiving, by a broadcast system, a request from an administrator to gain access to a broadcast messaging interface operated by the broadcast system, said request including a group identifier and a authentication code, said broadcast messaging interface configured to enable the administrator to broadcast a message simultaneously to a plurality of recipients associated with the group identifier;

authenticating, by the broadcast system, the administrator with respect to the group identifier using the authentication code provided by the administrator;

subsequent to authentication of the administrator, displaying, by the broadcast system, a user interface providing the administrator with a plurality of interface tools for composing and broadcasting said information in the form of an SMS message to the plurality of recipients associated with the group identifier, receiving, by the broadcast system, a selection of a message type of the SMS message to be broadcast, the selection enabling the user to optionally configure the SMS message to be transmitted to the plurality of recipients as a one-way message or a bidirectional message, said one-way message preventing recipients from being able to respond to the eventually transmitted SMS message, said bidirectional message providing recipients with the option of responding to one or more of the administrator or the plurality of recipients with a response to the eventually transmitted SMS message;

receiving, by the broadcasts system, the administrator's selection of one or more recipients or one or more groups of recipients associated with the group identifier, said one or more groups of recipients having been predefined based on specific broadcasting criteria defined by the administrator, said selection for identifying specific recipients for receiving the administrator's information as an SMS message in the message type as previously selected by the administrator;

receiving, by the broadcast system, a body of the SMS message from the administrator via the user interface; and transmitting, by the broadcast system, the SMS message to said specific recipients as identified by the administrator, wherein upon receipt of the SMS message by each specific recipient, the broadcast system enables the recipient to subscribe as an authenticated subscriber associated with the group identifier prior to being able to retrieve the SMS message if the recipient is not already registered as a valid subscriber.

2. The method of claim 1, further comprising:

compiling recipient responses to the SMS message if the SMS message is a two-way messaging alert; and displaying the compiled recipient responses to the administrator.

3. The method of claim 1, wherein each subscriber is associated with subscriber information including a cellular phone number, a subscriber name, and a group.

4. The method of claim 3, wherein the recipients are selected from a set of predefined groups.

5. The method of claim 1, further comprising:

responsive to a second administrator request, displaying previously transmitted SMS messages.

6. The method of claim 1, wherein the administrator is an authorized school official.

7. The method of claim 6, wherein each subscriber is a student of a school administrated by the authorized school official.

8. A system for broadcasting information in real time to a plurality of recipients, the system comprising:

the selected a processor;

a memory configured to store a set of instructions, which when executed by the processor cause the system to perform a method, the method including:

receiving, by a broadcast system, a request from an administrator to gain access to a broadcast messaging interface operated by the broadcast system, said request including a group identifier and a authentication code, said broadcast messaging interface configured to enable the administrator to broadcast a message simultaneously to a plurality of recipients associated with the group identifier;

authenticating, by the broadcast system, the administrator with respect to the group identifier using the authentication code provided by the administrator;

subsequent to authentication of the administrator, displaying, by the broadcast system, a user interface providing the administrator with a plurality of interface tools for composing and broadcasting said information in the form of an SMS message to the plurality of recipients associated with the group identifier, receiving, by the broadcast system, a selection of a message type of the SMS message to be broadcast, the selection enabling the user to optionally configure the SMS message to be transmitted to the plurality of recipients as a one-way message or a bidirectional message, said one-way message preventing recipients from being able to respond to the eventually transmitted SMS message, said bidirectional message providing recipients with the option of responding to one or more of the administrator or the plurality of recipients with a response to the eventually transmitted SMS message;

receiving, by the broadcasts system, the administrator's selection of one or more recipients or one or more groups of recipients associated with the group identifier, said one or more groups of recipients having been predefined based on specific broadcasting criteria defined by the administrator, said selection for identifying specific recipients for receiving the administrator's information as an SMS message in the message type as previously selected by the administrator;

receiving, by the broadcast system, a body of the SMS message from the administrator via the user interface; and transmitting, by the broadcast system, the SMS message to said specific recipients as identified by the administrator, wherein upon receipt of the SMS message by each specific recipient, the broadcast system enables the recipient to subscribe as an authenticated subscriber associated with the group identifier prior to being able to retrieve the SMS message if the recipient is not already registered as a valid subscriber.

9. The system of claim 8, the server further configured to, compile recipient responses to the SMS message if the SMS message is a two-way messaging alert; and display the compiled recipient responses to the administrator.

10. The system of claim 8, wherein each subscriber is associated with subscriber information including a cellular phone number, a subscriber name, and a group.

11. The system of claim 10, wherein the recipients are selected from a set of predefined groups.

12. The system of claim 8, the server further configured to, responsive to a second administrator request, display previously transmitted SMS messages.

13. The system of claim 8, wherein the administrator is an authorized school official.

14. The system of claim 13, wherein each subscriber is a student of a school administrated by the authorized school official.

15. A non-transitory computer-readable medium including instructions adapted to execute a method for broadcasting information in real time to a plurality of recipients, the method comprising:

receiving, by a broadcast system, a request from an administrator to gain access to a broadcast messaging interface operated by the broadcast system, said request including a group identifier and a authentication code, said broadcast messaging interface configured to enable the administrator to broadcast a message simultaneously to a plurality of recipients associated with the group identifier;

authenticating, by the broadcast system, the administrator with respect to the group identifier using the authentication code provided by the administrator;

subsequent to authentication of the administrator, displaying, by the broadcast system, a user interface providing the administrator with a plurality of interface tools for composing and broadcasting said information in the form of an SMS message to the plurality of recipients associated with the group identifier, receiving, by the broadcast system, a selection of a message type of the SMS message to be broadcast, the selection enabling the user to optionally configure the SMS message to be transmitted to the plurality of recipients as a one-way message or a bidirectional message, said one-way message preventing recipients from being able to respond to the eventually transmitted SMS message, said bidirectional message providing recipients with the option of responding to one or more of the administrator or the plurality of recipients with a response to the eventually transmitted SMS message;

receiving, by the broadcasts system, the administrator's selection of one or more recipients or one or more groups of recipients associated with the group identifier, said one or more groups of recipients having been predefined based on specific broadcasting criteria defined by the administrator, said selection for identifying specific recipients for receiving the administrator's information as an SMS message in the message type as previously selected by the administrator;

receiving, by the broadcast system, a body of the SMS message from the administrator via the user interface; and transmitting, by the broadcast system, the SMS message to said specific recipients as identified by the administrator, wherein upon receipt of the SMS message by each specific recipient, the broadcast system enables the recipient to subscribe as an authenticated subscriber associated with the group identifier prior to being able to retrieve the SMS message if the recipient is not already registered as a valid subscriber.

16. The medium of claim 15, the method further comprising:
compiling recipient responses to the SMS message if the SMS message is a two-way messaging alert; and
displaying the compiled recipient responses to the administrator.

17. The medium of claim 15, wherein each subscriber is associated with subscriber information including a cellular phone number, a subscriber name, and a group.

18. The medium of claim 17, wherein the recipients are selected from a set of predefined groups.

19. The medium of claim 15, the method further comprising:
responsive to a second administrator request, displaying previously transmitted SMS messages.

20. The medium of claim 15, wherein the administrator is an authorized school official, and each subscriber is a student of a school administrated by the authorized school official.

* * * * *